(12) United States Patent
Dove

(10) Patent No.: US 7,466,668 B2
(45) Date of Patent: Dec. 16, 2008

(54) REDUCED PIN-COUNT SYSTEM INTERFACE FOR GIGABIT ETHERNET PHYSICAL LAYER DEVICES

(75) Inventor: Daniel J. Dove, Colfax, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1555 days.

(21) Appl. No.: 09/939,418

(22) Filed: Aug. 24, 2001

(65) Prior Publication Data

US 2003/0084195 A1 May 1, 2003

(51) Int. Cl.
*H04B 3/36* (2006.01)
*H03J 3/16* (2006.01)
*G06F 3/00* (2006.01)
*G06F 13/12* (2006.01)
*G06F 15/16* (2006.01)

(52) U.S. Cl. .................. 370/293; 370/463; 370/465; 370/469; 709/250; 709/253; 710/20; 710/62; 710/313

(58) Field of Classification Search ............... 370/293, 370/393, 396.6, 463, 465, 469; 713/401; 709/250, 253; 710/20, 62, 313
See application file for complete search history.

(56) References Cited

U.S. PATENT DOCUMENTS

| | | | | |
|---|---|---|---|---|
| 5,598,418 A | * | 1/1997 | Lo et al. | 370/501 |
| 5,953,345 A | * | 9/1999 | Findlater et al. | 370/446 |
| 6,044,087 A | * | 3/2000 | Muller et al. | 370/463 |
| 6,061,362 A | | 5/2000 | Muller et al. | |
| 6,065,073 A | * | 5/2000 | Booth | 710/46 |
| 6,067,585 A | * | 5/2000 | Hoang | 710/11 |
| 6,108,726 A | | 8/2000 | Runaldue et al. | |
| 6,115,364 A | * | 9/2000 | Talaat et al. | 370/293 |
| 6,215,816 B1 | * | 4/2001 | Gillespie et al. | 375/219 |
| 6,222,852 B1 | * | 4/2001 | Gandy | 370/463 |
| 6,345,310 B1 | * | 2/2002 | Allison et al. | 709/250 |
| 6,353,169 B1 | * | 3/2002 | Juszkiewicz et al. | 84/600 |
| 6,385,208 B1 | * | 5/2002 | Findlater et al. | 370/419 |
| 6,459,700 B1 | * | 10/2002 | Hoang | 370/401 |
| 6,507,591 B1 | * | 1/2003 | Bray | 370/501 |

(Continued)

FOREIGN PATENT DOCUMENTS

WO    WO 98/11695    3/1998

OTHER PUBLICATIONS

Howard M. Frazier, Jr., "Media Independent Interface Concepts and Guidelines," Wescon Conference, IEEE Center, Hoes Lane, U.S., Nov. 7, 1995, pp. 348-353.

*Primary Examiner*—Alpus H Hsu

(57) ABSTRACT

A Gigabit Media Independent Interface (RGMII), which is adapted to also implement a ten bit interface (RTBI) that is intended to be an alternative to both the IEEE 802.3z GMII and the TBI is disclosed. The interface has a reduced number of input and output pins, i.e., pin-count, that can implement the above GMII and TBI standards. More particularly, the interface reduces the number of pins required to interconnect the MAC and the PHY from a maximum of 28 pins (TBI) to 13 pins in a cost effective and technology independent manner. The RGMII maps pins to transfer data at the same data rate with control functionality with a minimum number of input and output pins, and does so by utilizing both the rising and falling edges of the clock signal and complies with existing interface specifications set forth in the IEEE standards.

13 Claims, 2 Drawing Sheets

U.S. PATENT DOCUMENTS

| | | | |
|---|---|---|---|
| 6,515,506 B1 * | 2/2003 | Lo ................................ | 326/38 |
| 6,516,352 B1 * | 2/2003 | Booth et al. ................. | 709/250 |
| 6,529,961 B1 * | 3/2003 | Bray ........................... | 709/250 |
| 6,604,206 B2 * | 8/2003 | Chadha et al. ............... | 713/401 |
| 6,631,138 B1 * | 10/2003 | Findlater et al. ............. | 370/446 |
| 6,704,296 B1 * | 3/2004 | Crayford et al. ............. | 370/279 |
| 6,795,450 B1 * | 9/2004 | Mills et al. ................... | 370/463 |
| 6,813,651 B1 * | 11/2004 | Smith et al. ................... | 710/20 |
| 6,816,505 B1 * | 11/2004 | Sutardja et al. .............. | 370/463 |
| 6,826,187 B1 * | 11/2004 | Hey et al. ................. | 370/395.6 |
| 6,865,189 B2 * | 3/2005 | Senthil et al. ............... | 370/466 |
| 6,868,088 B2 * | 3/2005 | Gibson et al. ................ | 370/419 |
| 6,920,132 B1 * | 7/2005 | Lo ............................... | 370/386 |
| 6,975,637 B1 * | 12/2005 | Lenell ......................... | 370/412 |
| 7,031,333 B1 * | 4/2006 | Findlater et al. ............. | 370/419 |
| 2001/0009553 A1 * | 7/2001 | Homann ..................... | 370/445 |
| 2001/0043603 A1 * | 11/2001 | Yu .............................. | 370/393 |
| 2002/0061018 A1 * | 5/2002 | Chien ......................... | 370/389 |
| 2002/0069301 A1 * | 6/2002 | Fan et al. .................... | 709/253 |
| 2002/0110144 A1 * | 8/2002 | Gibson et al. ................ | 370/465 |
| 2002/0126684 A1 * | 9/2002 | Findlater et al. ............. | 370/419 |
| 2002/0176357 A1 * | 11/2002 | Lay ............................. | 370/229 |
| 2002/0181450 A1 * | 12/2002 | Sokol et al. ................. | 370/364 |
| 2002/0184550 A1 * | 12/2002 | Chadha et al. ............... | 713/401 |

* cited by examiner

REDUCED PIN-COUNT SYSTEM INTERFACE FOR GIGABIT ETHERNET PHYSICAL LAYER DEVICES

BACKGROUND OF THE INVENTION

The present invention generally relates to computer networking, and more particularly to an interface for physical layer devices operating in a network. The present invention is particularly adapted for use in Gigabit Ethernet physical layer devices.

Those skilled in the art of local area networks (LAN) know that standards define the parameters of communication and vary depending upon the speed and type of operation that is being employed in the system., Even though individual LANs may employ one or more of various standards, they typically use a medium consisting of twisted copper wire pairs for the transmission and reception of data. It is generally a requirement that one or more pairs be used for transmission of data in one direction and one or more other pairs to receive data in the opposite direction.

As is also known to those skilled in the art, it is necessary to have an interface for providing serialized data on the pairs of wires for transmitting and receiving data that may not be in serial form when input to the interfaces. Depending upon the particular standard being used, there may be up to 28 pins of data that are input to the interface for a ten bit interface (TBI) or a Gigabit media independent interface (GMII) or a media independent interface (MII). These standards are set forth in Institute of Electric and Electronic Engineers (IEEE) standards identified as IEEE802.3u MII and IEEE802.3z GMII and the TBI.

SUMMARY OF THE INVENTION

The present invention is directed to a reduced number of input and output pins, i.e., pin-count, that can implement the above GMII and TBI standards, and is hereinafter referred to as the Reduced Gigabit Media Independent Interface (RG-MII), which is adapted to also implement a reduced ten bit interface (RTBI). The RGMII is intended to be an alternative to both the IEEE802.3z GMII and the TBI. The principle objective is to reduce the number of pins required to interconnect the MAC and the PHY from a maximum of 28 pins (TBI) to 13 pins in a cost effective and technology independent manner. The RGMII is adapted to map pins to transfer data at the same data rate with control functionality with a minimum number of input and output pins. It does so by utilizing both the rising and falling edges of the clock signal and complies with existing interface specifications set forth in the IEEE standards and utilizes a unique assignment of pins to accomplish optimization in the operation of the interface. To accomplish this optimization, the data paths and all associated control signals are reduced and control signals are multiplexed together and both edges of the clock signal is used. A novel selection of signal assignments optimizes this interface beyond any obvious selection. For example, assigning CRS and COL together allows gigabit implementations which are typically full-duplex to eliminate an additional pin.

DETAILED DESCRIPTION

Figure 1:
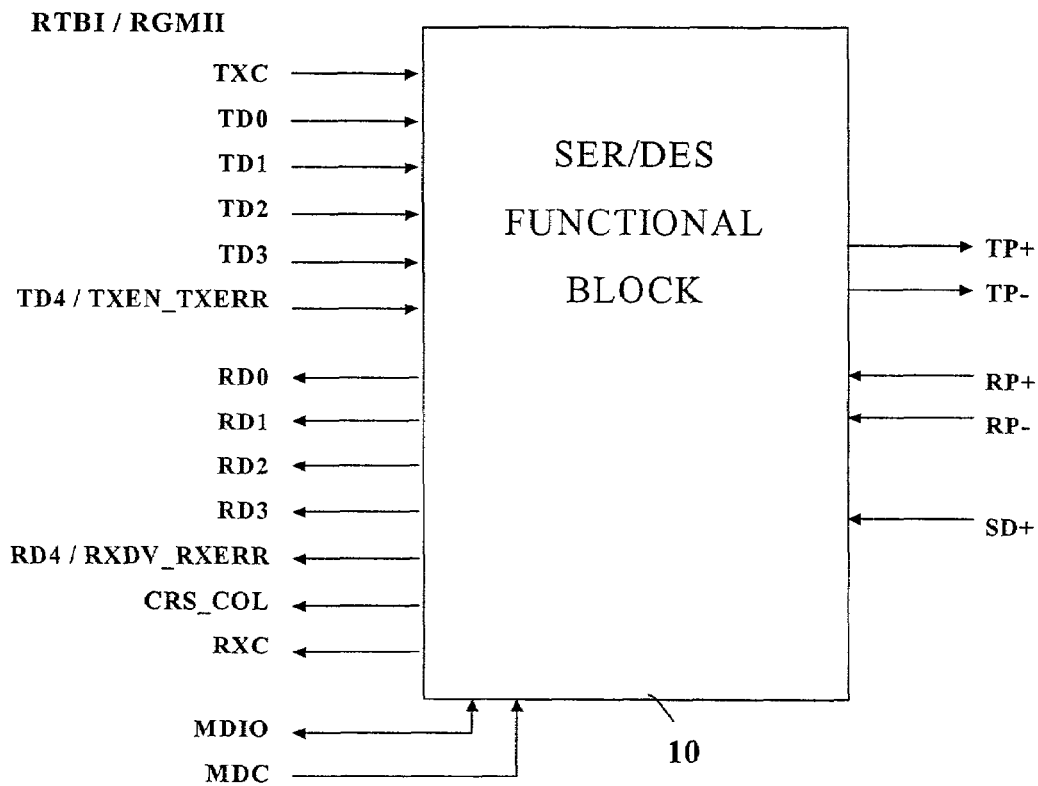
FIG. 1 is a block diagram of the system illustrating the 12 input and output pins to the serializer/deserializer or PHY embodying the present invention.

The signal definitions that apply to the present invention are set forth in the following TABLE 1. The table has four columns, which from left to right indicate the signal name, RTBI mode, RGMII mode and a description of the signals. The signals are signals that are applied or are produced on the pins shown on the left side of a Serializer/Deserializer (SER/DES) shown in FIG. 1. The RGMII shares four data path signals (TD[3:0]) with the Reduced Ten Bit Interface (RTBI) and shares control functionality with a fifth data signal (TX_CTL) in the transmit mode and similar sharing occurs in the receive mode (RD [3:0] and RX_CTL). The transmit clock signal TXC and receive clock signal RXC complete the 12 pins. With the inclusion of the MDIO/MDC serial management signals, the RTBI does not require independent control signals like LK_REF, BYTE_EN, etc. The register assignment of the SER/DES shown in FIG. 1 can be made in various ways by an implementer of the present invention.

With respect to TABLE 1, the TXC signal is the transmit reference clock signal and can be either a 125 Mhz, 25 Mhz or 2.5 Mhz clock signal depending upon the chosen implementation. The RXC signal is a receive reference clock signal and has the same speed values and is derived from the received data stream. The TD signals are provided on four lines that are labeled TD0-TD3. In the RTBI mode, bits 3:0 are transmitted on the rising edge of the TXC clock signal and bits 5 through 8 are transmitted on the falling edge of the clock signal. In the RGMII mode, bits 3:0 are transmitted on the rising edge of the clock signal and bits 7:4 are transmitted on the falling edge of the clock signal. The signal TX_CTL signal provides some data information as well as control signals. With the RTBI mode, the fifth bit is transmitted on the rising edge of the TXC clock signal and the tenth bit is transmitted on the falling edge of the clock signal. An RGMII mode signal TXEN is transmitted on the rising edge of the clock signal and an error code TXERR is transmitted on the falling edge of the clock signal. As is clear from the table, the received data is assigned to four pins that are similarly defined as are the TD signal and an RX_CTL signal is defined in a manner similar to the TX_CTL signal. The RXDV and RXERR signals are status signals indicating that the data is either valid or in error. The RXDV signal is applied on the rising edge of the clock signal and the RXERR signal on the falling edge thereof. The CRS signal may be applied on the rising edge of the clock signal and a COL signal on the falling edge thereof for half duplex implementations.

TABLE 1

| Signal Name | RTBI | RGMII | Description |
| --- | --- | --- | --- |
| TXC | MAC | MAC | The transmit reference clock signal will be 125 Mhz, +−50 ppm with a maximum peak-peak jitter of 100 ps. |
| TD[3:0] | PCS | MAC | In RTBI mode, contains bits 3:0 on ↑ of TXC and bits 8:5 on ↓ of TXC. In RGMII mode, bits 3:0 on ↑ of TXC, bits 7:4 on ↓ of TXC |
| TD[4]_TD[9] TXEN_TXERR | PCS | MAC | In RTBI mode, contains the fifth bit on ↑ of TXC and tenth bit on ↓ of TXC. In RGMII mode, TXEN on ↑ of TXC, TXERR on ↓ of TXC |
| RXC | PHY | PHY | The receive reference clock signal will be 125 Mhz, +−50 ppm. (May be derived from TXC) |
| RD[3:0] | PHY | PHY | In RTBI mode, contains bits 3:0 on ↑ of RXC and bits 8:5 on ↓ of RXC. In RGMII mode, bits 3:0 on ↑ of RXC, bits 7:4 on ↓ of RXC |

TABLE 1-continued

| Signal Name | RTBI | RGMII | Description |
|---|---|---|---|
| RD[4]_RD[9] RXDV_RXERR | PHY | PHY | In RTBI mode, contains the fifth bit on ↑ of RXC and tenth bit on ↓ of RXC. In RGMII mode, RXDV on ↑ of TXC, RXERR on ↓ of TXC |
| CRS_COL | N/A | PHY (OPT*) | CRS on ↑ of TXC, COL on ↓ of TXC (*CRS_COL required for half-duplex implementations only) |

Figure 2:
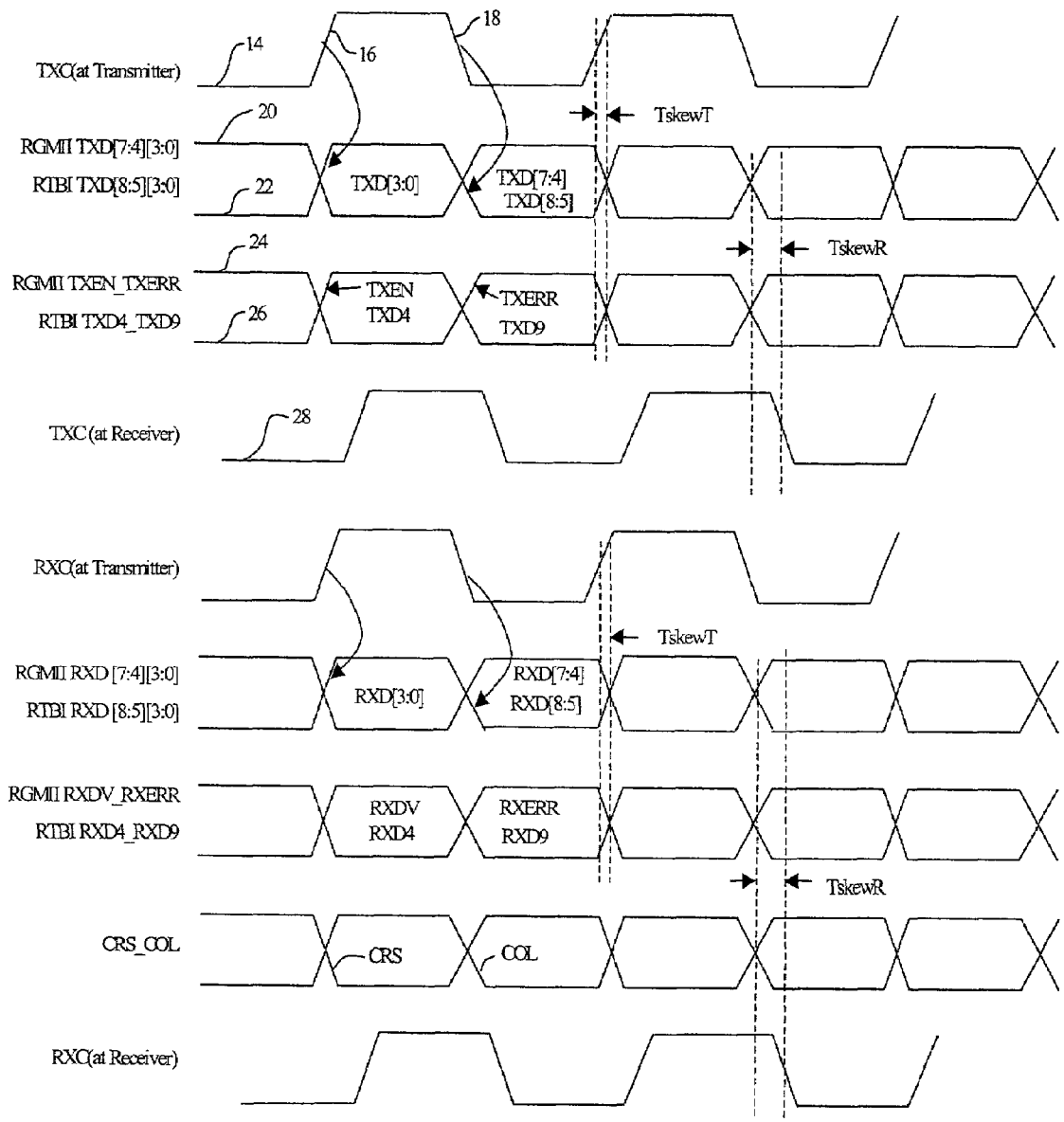
FIG. 2 is a multiplexing and timing diagram of the system embodying the present invention.

As is clear from the table, it is understood that data and control information is multiplexed by taking advantages of both edges of the reference clock signals and sending the lower four bits on the rising edge and the upper four bits on the falling edge of the clock signal. Control signals are preferably multiplexed into a single clock cycle using the same technique. The manner in which the multiplexing is carried out is generally indicated in the multiplexing and timing diagram shown in FIG. 2. The transmitted clock signal TXC is shown at 14 and has rising edges 16 and falling edges 18 as indicated. The transmit data signals for the RGMII mode are shown on line 20, where the lower four bits of data are transmitted during the rising edge of the clock signal and bits 7:4 being transmitted at the time of the falling edge of the clock signal 18. With regard to the RTBI mode, it is shown on line 22 where the higher bits 3:0 are also transmitted on the rising edge 16 of the clock signal and bits 8:5 are transmitted at the time of the falling edge 18 of the clock signal. In the RGMII mode, the transmit enable TXEN signal and the transmit error TXERR signals are applied on line 24 with the TXEN signal being applied at the time of the rising edge of the clock signal and TXERR at the time of the falling edge 18 of the clock signal. In the RTBI mode, the line 26 transmits data bit 4 and on the rising edge and bit 9 on the falling edge. The timing of the transmit clock signal received at the receiver is shown on line 28 and is skewed relative to the transmitted data by an amount TskewR which is larger than the amount of skew that is provided of the TXC clock signal of the clocking of the data being transmitted. The critical timing specifics are set forth in Table 3 and include the TskewT (also illustrated in FIG. 2) is the data to clock output skew at the transmitter and as shown in the table, it is within plus or minus 500 picoseconds. The TskewR signal is the data to clock input skew that is measured at the receiver and must be within 1 and 2.8 nanoseconds. As is set forth in the table, this skew will require introducing delay that will be added to the associated clock signal to guarantee that received data has settled down before the clock signal edge arrives in which to sample the data. This is normally done by routing the clock signal on the printed circuit board in such a way to provide the necessary trace delay to comply with the specification. Other items of Table 3 include the clock cycle duration of 7.2 to 8.8 nanoseconds for 2.5 MHz clock signal, as well as the duty cycle and rise and fall times which are relatively self-explanatory and known to those of ordinary skill in the art.

With regard to the signal levels that are use, the RGMII and RTBI signals are based upon 2.5v CMOS interface voltages, although other implementations may be used. With the preferred implementation, the signal levels are as shown in the following Table 2.

TABLE 2

| Symbol | Parameter | Conditions | Min | Max | Units |
|---|---|---|---|---|---|
| VOH | Output High Voltage | IOH = −1.0 mA; VCC = Min | 2.1 | VDD + .3 | V |
| VOL | Output Low Voltage | IOL = 1.0 mA; VCC = Min | GND − .3 | 0.40 | V |
| VIH | Input High Voltage | VIH > VIH_Min; VCC = Min | 1.7 | — | V |
| VIL | Input Low Voltage | VIH > VIL_Max; VCC = Min | — | .70 | V |
| IIH | Input High Current | VCC = Max; VIN = 2.5 V | — | 15 | µA |
| IIL | Input Low Current | VCC = Max; VIN = 0.4 V | −15 | — | µA |

It is preferred that the timing for this interface will be such that the clock signal and data are generated simultaneously by the source of the signals and therefore skew between the clock signal and data is critical to proper operation. This provides tighter control of skew.

TABLE 3

| Symbol | Parameter | Min | Typical | Max | Units |
|---|---|---|---|---|---|
| TskewT | Clock to Data output Skew (at Transmitter) | −500 | 0 | 500 | ps |
| TskewR | Clock to Data input Skew (at Receiver) (This implies that PC board design will require clock signals to be routed such that an additional trace delay of greater than 1.5 ns will be added to the associated clock signal.) | 1.0 | | 2.0 | ns |
| Tcyc | Clock Cycle Duration | 7.5 | 8 | 8.5 | ns |
| Tpuh | Positive Pulse Width | 3.8 | 4 | 4.2 | ns |
| Tpul | Negative Pulse Width | 3.8 | 4 | 4.2 | ns |
| Tr/Tf | Rise/Fall Time (20-80%) | | | .75 | ns |

This present invention can be used to implement the 10/100 Mbps Ethernet Serial Media Independent Interface (SMII) by using TXC, TXD, RXD signals at the 125 MHz rate as specified in the SMII version 1.2 document and the SYNCH bit can be multiplexed upon the TXEN signal. Support for SMII version 2.1 may be implemented by using RXCLK for self-synchronous clocking, but it is optional.

The decision about which mode of operation the interface will use is also a matter of choice. It may be done with hard-wired pins, or through register bits that are controlled by software which is easier to implement in an integrated circuit than fixed delay offsets.

From the foregoing it should be understood that a media independent interface has been shown and described which can implement the BMII and TBI standards described herein and which has a reduced number of input and output pins required to interconnect the MAC and the PHY from a maximum of 28 pins (TBI) to 13 pins in a cost effective and technology independent manner. The RGMII is adapted to map pins to transfer data at the same data rate with control functionality with a minimum number of input and output pins.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. Apparatus for interfacing a media access controller (MAC) and a physical layer device (PHY) for operating as either a gigabit media independent interface or a ten bit interface, transferring data at a predetermined clock rate while substantially reducing the required number of input and output pins, said apparatus comprising:

a multiplexer for mapping data and control signals that are normally applied to a predetermined number of pins to a lesser number of pins.

2. Apparatus as defined in claim 1 wherein said multiplexer multiplexes different significant bits of data on the same set of pins using both edges of a clock signal having the predetermined rate, thereby transferring data at the predetermined rate on the lesser number of pins.

3. Apparatus as defined in claim 2 wherein the clock rate is within the range of about 2.5 MHz and about 125 MHz, with the clock rate being within the range of about 2.5 and about 25 MHz for the ten bit interface and about 125 MHz for the gigabit media independent interface operation.

4. Apparatus as defined in claim 3 wherein the clock signal has a duty cycle for gigabit media independent interface operation that is within the range of 45 and 55 percent and a duty cycle for the ten bit interface operation that is within the range of 40 and 60 percent.

5. Apparatus as defined in claim 2 wherein said multiplexer controls the relative timing between the clock signal and the data during transmitting and during receiving, the clock and data signals being generated substantially simultaneously when either the MAC or the PITY transmits the signals, such that the data to clock output skew at the transmitter is within +/−500 picoseconds and the data to clock input skew at the receiver is between about 1 and about 2.8 nanoseconds for clock signal speeds within the range of 2.5 MHz and 125 MHz.

6. Apparatus as defined in claim 1 wherein CRS and COL control signals are applied on a single pin.

7. Apparatus for interfacing a media access controller (MAC) and a physical layer device (PHY) for operating as at least one of a gigabit media independent interface and a ten bit interface, transferring data at a predetermined clock rate while substantially reducing the required number of input and output pins, said apparatus comprising:

a multiplexer for mapping data and control signals that are normally applied to a predetermined number of pins to a lesser number of pins; and six input pins for use in either the gigabit media independent interface operation or the ten bit interface operation in which:

a transmit reference clock signal TXC is applied to a first pin in the gigabit media independent interface operation and the ten bit interface operation;

8 bits of data are applied to the second through fifth pins on both edges of a clock cycle during the gigabit media independent interface operation and the ten bit interface operation;

2 bits of data are applied to the sixth pin in the ten bit interface operation; and, control signals are applied to the second through fifth pin in the gigabit media independent interface operation.

8. Apparatus for interfacing a media access controller (MAC) and a physical layer device (PHY) for operating as at least one of a gigabit media independent interface and a ten bit interface, transferring data at a predetermined clock rate while substantially reducing the required number of input and output pins, said apparatus comprising:

a multiplexer for mapping data and control signals that are normally applied to a predetermined number of pins to a lesser number of pins; and six output pins for use in either the gigabit media independent interface operation or the ten bit interface operation in which:

a receive reference clock signal RXC is derived from the received data stream and appears on a first pin in the gigabit media independent interface operation and the ten bit interface operation;

8 bits of data are applied to the second through fifth pins on both edges of a clock cycle during the gigabit media independent interface operation and the ten bit interface operation;

2 bits of data are applied to the sixth pin in the ten bit interface operation; and, control signals are applied to the second through fifth pin in the gigabit media independent interface operation.

9. A media interface for a media access controller (MAC) and a physical layer device (PHY) for operating as at least a gigabit media independent interface and a ten bit interface, which interface transfers data responsive to receiving a clock signal having a predetermined clock rate on a reduced number of pins, said interface multiplexing the data and control signals that are applied to the reduced number of pins using both edges of said clock signal and for selectively mapping the data and control signals to the reduced number of pins, wherein CRS and COL control signals are applied on a single pin.

10. A media interface as defined in claim 9 wherein the reduced number of pins is 13.

11. A media interface for a media access controller (MAC) and a physical layer device (PHY) for operating as at least a gigabit media independent interface and a ten bit interface, which interface transfers data responsive to receiving a clock signal having a predetermined clock rate on a reduced number of pins, said interface multiplexing the data and control signals that are applied to the reduced number of pins using both edges of said clock signal and for selectively mapping the data and control signals to the reduced number of pins;

six input pins for use in either the gigabit media independent interface operation or the ten bit interface operation in which:

a transmit reference clock signal TXC is applied to a first pin in the gigabit media independent interface operation and the ten bit interface operation;

8 bits of data are applied to the second through fifth pins on both edges of a clock cycle during the gigabit media independent interface operation and the ten bit interface operation;

2 bits of data are applied to the sixth pin in the ten bit interface operation; and, control signals are applied to the second through fifth pin in the gigabit media independent interface operation.

12. A media interface for a media access controller (MAC) and a physical layer device (PHY) for operating as at least a gigabit media independent interface and a ten bit interface, which interface transfers data responsive to receiving a clock signal having a predetermined clock rate on a reduced number of pins, said interface multiplexing the data and control signals that are applied to the reduced number of pins using both edges of said clock signal and for selectively mapping the data and control signals to the reduced number of pins;

six output pins for use in either the gigabit media independent interface operation or the ten bit interface operation in which:
a receive reference clock signal RXC is derived from the received data stream and appears on a first pin in the gigabit media independent interface operation and the ten bit interface operation;
8 bits of data are applied to the second through fifth pins on both edges of a clock cycle during the gigabit media independent interface operation and the ten bit interface operation;
2 bits of data are applied to the sixth pin in the ten bit interface operation; and,
control signals are applied to the second through fifth pin in the gigabit media independent interface operation.

13. A method of interfacing a media access controller (MAC) and a physical layer device (PHY) for operating either as a gigabit media independent interface or a ten bit interface, and transfer data at a predetermined rate while substantially reducing the required number of input and output pins, said method comprising:
multiplexing data and control signals using both edges of a clock signal having the predetermined rate; and,
strategically mapping the data and control signals that are normally applied to a predetermined number of pins to a significantly lesser number of pins while still maintaining the operability of the interface.

* * * * *

UNITED STATES PATENT AND TRADEMARK OFFICE
CERTIFICATE OF CORRECTION

PATENT NO. : 7,466,668 B2 Page 1 of 1
APPLICATION NO. : 09/939418
DATED : December 16, 2008
INVENTOR(S) : Daniel J. Dove It is certified that error appears in the above-identified patent and that said Letters Patent is hereby corrected as shown below:

In column 5, line 33, in Claim 5, delete "PITY" and insert -- PHY --, therefor.

Signed and Sealed this

Sixteenth Day of February, 2010

David J. Kappos
*Director of the United States Patent and Trademark Office*